(12) United States Patent
Ito et al.

(10) Patent No.: US 6,884,487 B2
(45) Date of Patent: Apr. 26, 2005

(54) OPTICAL RECORDING MEDIUM, RECORDING MATERIAL, METHOD OF PRODUCING OPTICAL RECORDING MEDIUM, AND OPTICAL RECORDING, READING AND REWRITING METHOD

(75) Inventors: Kazunori Ito, Kanagawa (JP); Eiko Hibino, Kanagawa (JP); Makoto Harigaya, Kanagawa (JP); Takashi Shibaguchi, Kanagawa (JP); Hajime Yuzurihara, Kanagawa (JP); Nobuaki Onagi, Kanagawa (JP); Hiroko Ohkura, Kanagawa (JP); Katsuhiko Tani, Tokyo (JP); Noriyuki Iwata, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/356,136

(22) Filed: Jan. 31, 2003

(65) Prior Publication Data
US 2003/0143365 A1 Jul. 31, 2003

Related U.S. Application Data

(63) Continuation of application No. 09/821,204, filed on Mar. 29, 2001, now abandoned.

(30) Foreign Application Priority Data
Mar. 31, 2000 (JP) ........................................ 2000-099757

(51) Int. Cl.$^7$ ................................................ B32B 3/02
(52) U.S. Cl. ..................... 428/64.1; 428/64.1; 428/64.5; 430/270.13
(58) Field of Search ............................... 428/64.1, 64.4, 428/64.5, 64.6, 913; 430/270.13, 495.1, 945; 369/283, 288

(56) References Cited

U.S. PATENT DOCUMENTS

| | | | | |
|---|---|---|---|---|
| 5,254,382 A | * | 10/1993 | Ueno | .......................... 428/64 |
| 6,115,352 A | * | 9/2000 | Ohno | ....................... 369/275.1 |
| 6,416,837 B1 | * | 7/2002 | Kojima | ....................... 428/64.1 |

* cited by examiner

*Primary Examiner*—Elizabeth Mulvaney
(74) *Attorney, Agent, or Firm*—Cooper & Dunham LLP

(57) ABSTRACT

An optical recording medium including a recording layer which includes a reversible phase-change recording material, the recording layer being capable of writing information therein, reading written information therefrom, and rewriting written information by utilizing the reversible phase change of the phase-change recording material, wherein when a recording mark formed in the recording layer is repeatedly read 5000 times, using a continuous wave laser beam having such an intensity Pr that satisfies the condition of $1.1 \leq R \leq 2.0$, in which R is $\sigma_{repeat}/\sigma_1$ as defined in the specification, the optical recording medium satisfies a relationship of $d_1 > d_{ow}$ as defined in the specification. The phase-change recording material, a method of producing the optical recording medium, and a method of writing information in the optical recording medium, reading written information therefrom and rewriting written information therein are proposed.

49 Claims, 9 Drawing Sheets

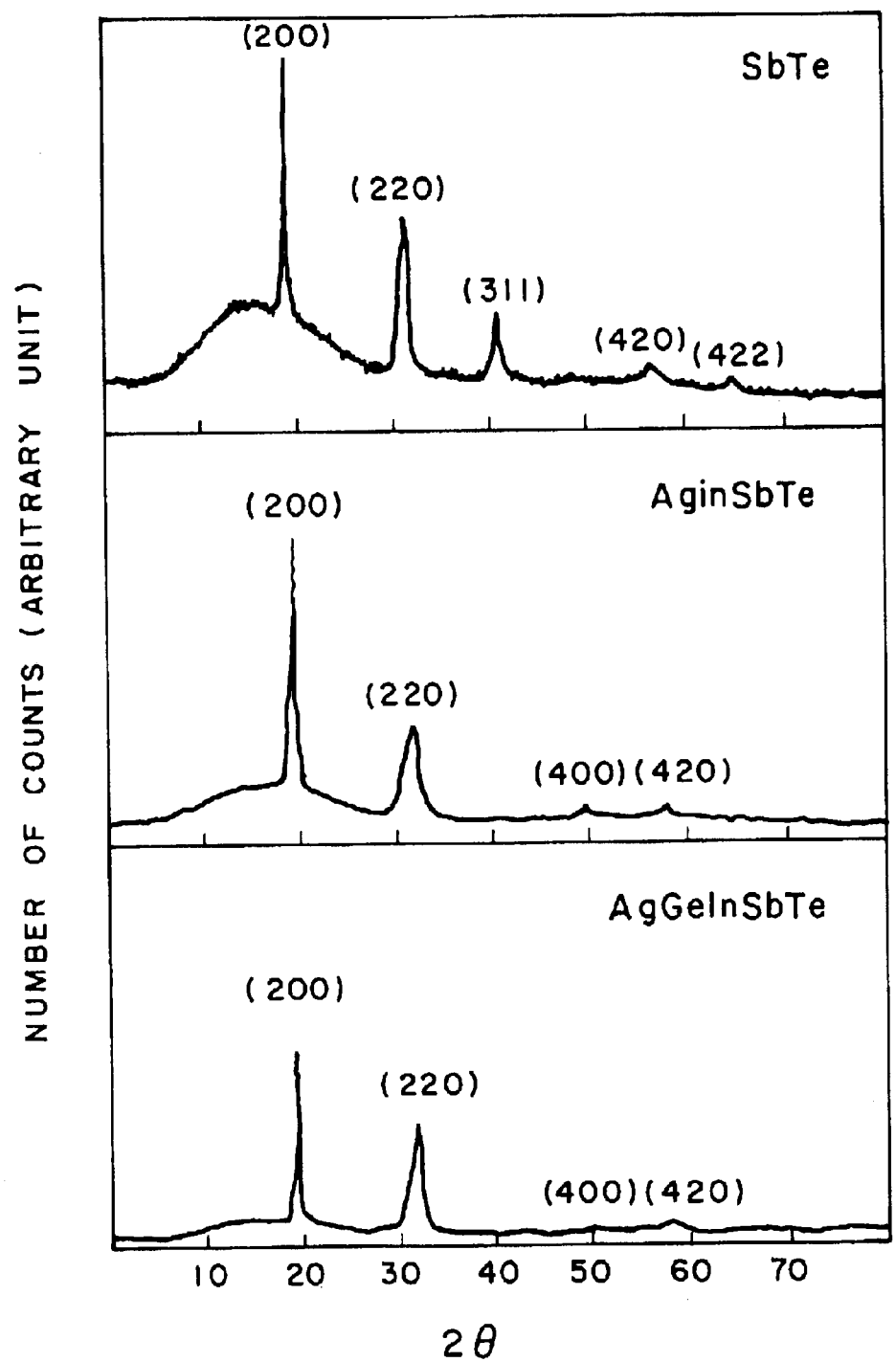

Sb-K-Edge (AMORPHOUS)

Sb-K-Edge (CRYSTAL)

Te-K-Edge (AMORPHOUS)

Te-K-Edge (CRYSTAL)

OPTICAL RECORDING MEDIUM, RECORDING MATERIAL, METHOD OF PRODUCING OPTICAL RECORDING MEDIUM, AND OPTICAL RECORDING, READING AND REWRITING METHOD

CROSS REFERENCE TO RELATED APPLICATION

This application is a continuation of applicants' U.S. patent application Ser. No. 09/821,204, filed Mar. 29, 2001 now abandoned.

BACKGROUND OF THE INVENTION

1. Field of the Invention

The present invention relates to an optical recording medium comprising a recording layer which is capable of writing information therein, reading written information therefrom, and rewriting written information therein. The present invention also relates to a recording material for use in the recording layer of the optical recording medium.

The present invention also relates to a method of producing the optical recording medium.

The present invention also relates to a method of writing information in the optical recording medium, reading written information therefrom, and rewriting written information therein.

2. Discussion of Background

As an optical recording medium capable of writing information therein, reading written information therefrom, and rewriting written information therein, with a light beam irradiation, there is well known a phase-change optical recording medium, which utilizes the reversible phase changes between a crystalline phase and an amorphous phase thereof.

The inventors of the present invention have studied phase-change optical recording media, in which an Sb—Te recording material and an Ag—In—Sb—Te recording material are used, and have discovered that the phase-change optical recording media using these recording materials have excellent characteristics, for example, in terms of C/N, erasing ratio, sensitivity, jittering, preservation stability, repeated writing and reading stability (hereinafter referred to as reading optical stability).

Attention has been paid to the recent trend that the optical recording media are being developed into DVD media. In comparison with conventional CD media, the DVD media have a larger capacity, so that it is required that the response or correspondence to recording linear velocity (hereinafter referred to as the correspondence to recording linear velocity) be higher and that the beam spot on a drive side be small.

As the conventionally proposed Sb—Te recording material and Ag—In—Sb—Te recording material, there have been employed materials with such a composition that can secure the preservation stability and the reading optical stability.

When attention is paid to Sb and Te of the constituent elements of the above-mentioned recording materials, the compositions in the shade area in the graph in FIG. 1 are used in the conventional CD media, in which graph the composition data are plotted with the recording linear velocity and the preservation stability (both with an arbitrary unit) as ordinate and Sb/(Sb+Te) as abscissa.

Such media have the problems that when the recording linear velocity is increased, the preservation stability and the reading optical stability deteriorate, and that when recording density is increased by reducing the size of the beam spot on the side of the drive, a sufficient sensitivity for use in practice cannot be obtained.

SUMMARY OF THE INVENTION

It is therefore a first object of the present invention to provide an optical recording medium from which the conventional problems in the prior art are eliminated, which has higher correspondence to the recording linear velocity in comparison with that of the conventional optical recording media, and excellent preservation stability and reading optical stability, and can be sufficiently used as DVD media.

A second object of the present invention is to provide a recording material for use in the above-mentioned optical recording medium of the present invention.

A third object of the present invention is to provide a method of producing the above-mentioned optical recording medium of the present invention.

A fourth object of the present invention is to provide a method of writing information, reading written information, and rewriting written information in the above-mentioned optical recording medium of the present invention.

The first object of the present invention can be achieved by an optical recording medium comprising a recording layer which comprises a phase-change recording material which is capable of performing a reversible phase change from a crystalline phase to an amorphous phase and vice versa by light irradiation of the phase-change recording material, the recording layer being capable of writing information therein, reading written information therefrom, and rewriting written information by utilizing the reversible phase change of the phase-change recording material, wherein when a recording mark formed in the recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of the recording mark, namely R is $\sigma_{repeat}/\sigma_1$, and a jitter increasing ratio of the 5000th repeated reading jitter $\sigma_{repeat}$ to the 1st reading jitter $\sigma_1$ is d $(=\sigma_{repeat}/\sigma_1)$, the optical recording medium satisfies a relationship of $d_1 > d_{ow}$, in which $d_1$ is the jitter increasing ratio of an initial writing mark, and $d_{ow}$ is a jitter increasing ratio of a 1000-times rewritten recording mark.

The inventors have researched into relationship between $d_1$ which is the jitter increasing ratio of an initial writing mark, and $d_{ow}$ which is a jitter increasing ratio of a 1000-times rewritten recording mark in conventional optical recording media, when a recording mark formed in a recording layer of a conventional optical recording medium is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of the recording mark to a 1st reading jitter $\sigma_1$ of the recording mark, namely R is $\sigma_{repeat}/\sigma_1$, and a jitter increasing ratio of the 5000th repeated reading jitter $\sigma_{repeat}$ to the 1st reading jitter $\sigma_1$ is d $(=\sigma_{repeat}/\sigma_1)$. As a result, it was discovered and confirmed that in the conventional optical recording media, $d_{ow} > d_1$, and this causes the shortcoming of the conventional optical recording media that when the recording linear velocity is increased, the preservation stability and the reading optical stability deteriorate.

The inventors of the present invention have discovered a recording material for use in the optical recording medium that makes $d_{ow}$ smaller than $d_1$, that is, $d_1 > d_{ow}$, in the optical recording medium as a result of their studies on the elements to be added to the recording layer, the fundamental structure of the phase of the recording material, the composition of the recording material, and the method of producing the recording layer.

The above-mentioned optical recording medium of the present invention has high correspondence to the recording linear velocity, and excellent reading optical stability and preservation stability.

Furthermore, since the recording material in the recording layer is a phase-change recording material which is capable of performing a reversible phase change from a crystalline phase to an amorphous phase and vice versa by light irradiation of the phase-change recording material, so that writing information in the recording layer, reading written information from the recording layer, and rewriting written information in the recording layer can be reversibly performed.

In the above-mentioned optical recording medium, it is preferable that the phase-change recording material comprise a pseudo binary composition, which has an NaCl-type crystal structure in the crystalline phase, wherein the pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, the pseudo binary composition is a pseudo binary eutectic composition, and that at least one of the portions represented by TeM comprises Sb, and at least one of the other portions represented by TeM comprises Ge.

Furthermore, in the above optical recording medium, it is preferable that the total content ratio A of Sb and Te in terms of atomic ratio contained in the pseudo binary composition of the phase-change recording material be in a range of $0.80 \leq A \leq 0.97$.

In the above optical recording medium, it is also preferable that the contents of Sb and Te in terms of atomic ratio contained in the pseudo binary eutectic composition of the phase-change recording material satisfy a relationship of $0.65 \leq Sb/(Sb+Te) \leq 0.85$.

In the above optical recording medium, it is also preferable that the content ratio B of Ge in terms of atomic ratio contained in the pseudo binary composition of the phase-change recording material be in a range of $0.01 \leq B \leq 0.07$.

In the above optical recording medium, it is also preferable that the pseudo binary composition of the phase-change recording material further comprise as an additional element at least one element selected from the group consisting of Ag, In and Bi.

In the above optical recording medium, it is also preferable that the pseudo binary composition of the phase-change recording material comprise Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

The second object of the present invention can be achieved by the same phase-change recording material as described above.

The third object of the present invention can be achieved by a method of producing the above-mentioned optical recording medium, comprising the step of forming the recording layer by performing sputtering, using a target, with a sputtering power of 0.1 kW to 1.5 kW, the target being prepared by fusing and mixing a composition composed of a plurality of elements with a predetermined composition, crushing the composition to prepare a pulverized composition, and sintering said pulverized composition.

The third object of the present invention can also be achieved by a method of producing the above-mentioned optical recording medium, comprising the step of forming the recording layer by performing sputtering, using the same target as mentioned above, with a sputtering pressure of 0.8 mTorr to 9 mTorr.

The third object of the present invention can also be achieved by a method of producing the above-mentioned optical recording medium, comprising the step of forming the recording layer by performing sputtering, using the same target as mentioned above, in a sputtering chamber with the pressure in the sputtering chamber being set at a vacuum degree of $9 \times 10^{-7}$ Torr or less immediately before the recording layer is formed.

The fourth object of the present invention can be achieved by a method of writing information, reading written information, and rewriting written information in the above-mentioned optical recording medium with irradiating the optical recording medium with a laser beam with a spot diameter of 0.05 μm to 2.0 μm.

The fourth object of the present invention can also be achieved by a method of writing information, reading written information, and rewriting written information in the above-mentioned optical recording medium with irradiating the optical recording medium with a linear recording speed of 1.2 m/s to 25 m/s, preferably with a linear recording speed of 3.5 m/s to 18 m/s.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows the results of an analysis by XRD of the crystal structure of each of recording materials at the initial crystallization thereof, which is used in the recording layer of the optical recording medium of the present invention.

DESCRIPTION OF THE PREFERRED EMBODIMENTS

The optical recording medium of the present invention comprises a recording layer comprising a phase-change recording material which is capable of performing a reversible phase change from a crystalline phase to an amorphous phase and vice versa by light irradiation of the phase-change recording material, the recording layer being capable of writing information therein, reading written information therefrom, and rewriting written information by utilizing the reversible phase change of the phase-change recording material, wherein when a recording mark formed in the recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of the recording mark, namely R is $\sigma_{repeat/\sigma1}$, and a jitter increasing ratio of the 5000th repeated reading jitter $\sigma_{repeat}$ to the 1st reading jitter $\sigma_1$ is d (=$\sigma_{repeat}/\sigma_1$), the optical recording medium satisfies a relationship of $d_1 > d_{ow}$, in which $d_1$ is the jitter increasing ratio of an initial writing mark, and $d_{ow}$ is a jitter increasing ratio of a 1000-times rewritten recording mark.

In the mark length modulation system in the present invention, the term "jitter" is defined by a value of σ/Tw, wherein σ is a standard deviation of the leading and trailing edges of a recording mark with reference to clock signals, and Tw is a detection window width of the clock signals.

Figure 2:
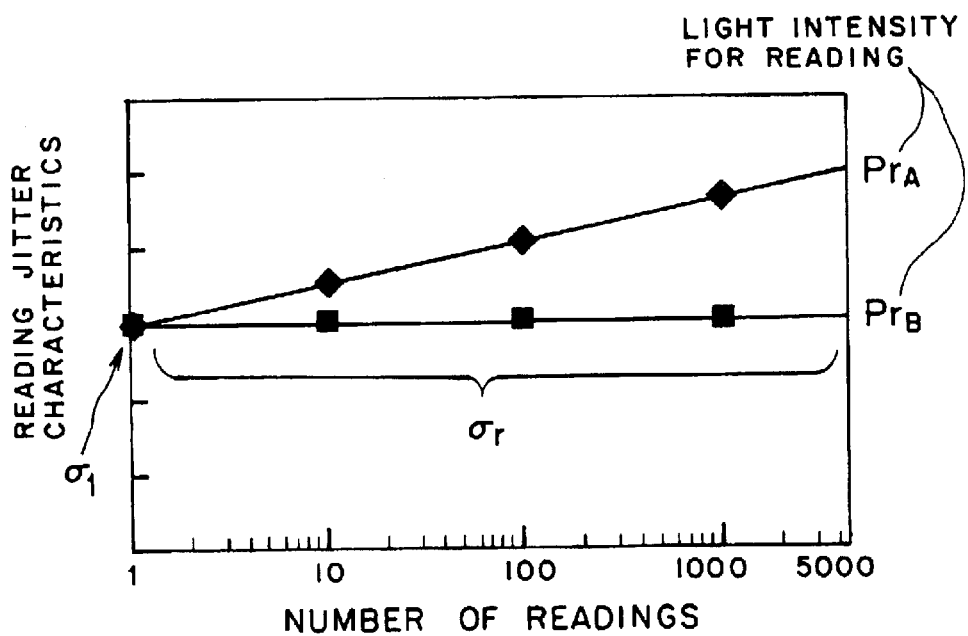
FIG. 2 is a diagram showing the relationship between the number of readings and the light intensity for reading and reading jitter characteristics.

FIG. 2 shows the relationship between the reading light intensity and reading jitter characteristics and the number of readings. In the figure, σ r denotes the reading jitter from the 2nd reading on.

In the above-mentioned optical recording medium of the present invention, the continuous wave laser beam having such an intensity Pr that satisfies the condition of $1.1 \leq R \leq 2.0$, wherein R=$\sigma_{repeat}/\sigma_1$, has an intensity which is about 1.1 to 2 times greater than that of a continuous wave laser beam used in the conventional drives. The use of this continuous wave laser beam is intended to subject the recording mark to forced and accelerated deterioration. In other words, in the conventional drives, for instance, when a laser beam is used for irradiation, the irradiation is carried out with a power of 0.3 mW to 0.8 mW, while in the measurement for the present invention, the irradiation is carried out with a power of 0.7 mW to 1.5 mW. In this case, the recording mark is formed with a conventional recording power of about 8 mW to 20 mW. The recording linear velocity is in the range of about 3.5 m/s to about 8.5 m/s. The light spot diameter is about 0.8 μm to 1.0 μm.

Studies made by the inventors of the present invention indicated that the optical recording media, in which $d_{ow} > d_1$, have the shortcoming that when the recording linear velocity is increased, the preservation stability and the reading optical stability deteriorate, and in contrast to this, when the optical recording media in which a recording material with $d_{ow} < d_1$ is used exhibit excellent correspondence to recording linear velocity, reading optical stability and preservation stability.

As mentioned above, the optical recording medium of the present invention satisfies the relationship of $d_1 > d_{ow}$, in which $d_1$ is the jitter increasing ratio of an initial writing mark, and $d_{ow}$ is a jitter increasing ratio of a 1000-times rewritten recording mark, when reading is performed under the above-mentioned conditions.

The optical recording medium which satisfies the above-mentioned conditions has excellent correspondence to recording linear velocity, reading optical stability and preservation stability and can be sufficiently used for DVD-RW.

As mentioned above, the recording layer of the optical recording medium of the present invention comprises a phase-change recording material which is capable of performing a reversible phase change from a crystalline phase to an amorphous phase and vice versa by light irradiation of the phase-change recording material.

The phase-change recording material may comprise a pseudo binary composition, which has an NaCl-type crystal structure in the crystalline phase, wherein the pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, the pseudo binary composition is a pseudo binary eutectic composition, and that at least one of the portions represented by TeM comprises Sb, and at least one of the other portions represented by TeM comprises Ge.

The above-mentioned pseudo binary composition and the NaCl-type crystal structure in the crystalline phase can be identified by an XRD (X-ray diffraction) analysis and an XAFS (Extended X-ray Absorption Fine Structure) analysis.

FIG. 3 shows the data of the crystalline structures of recording materials, SbTe, AgInSbTe, and AgGeInSbTe, at the initial crystallization thereof for use in the recording layer of the optical recording medium of the present invention, obtained by XRD. The data indicated that each of these materials can be indexed as having the NaCl-type crystal structure.

In the above optical recording medium, it is preferable that the total content ratio A of Sb and Te in terms of atomic ratio contained in the pseudo binary composition of the phase-change recording material be in a range of $0.80 \leq A \leq 0.97$ from the viewpoints of the recording linear velocity and the reading optical stability.

Figure 1:
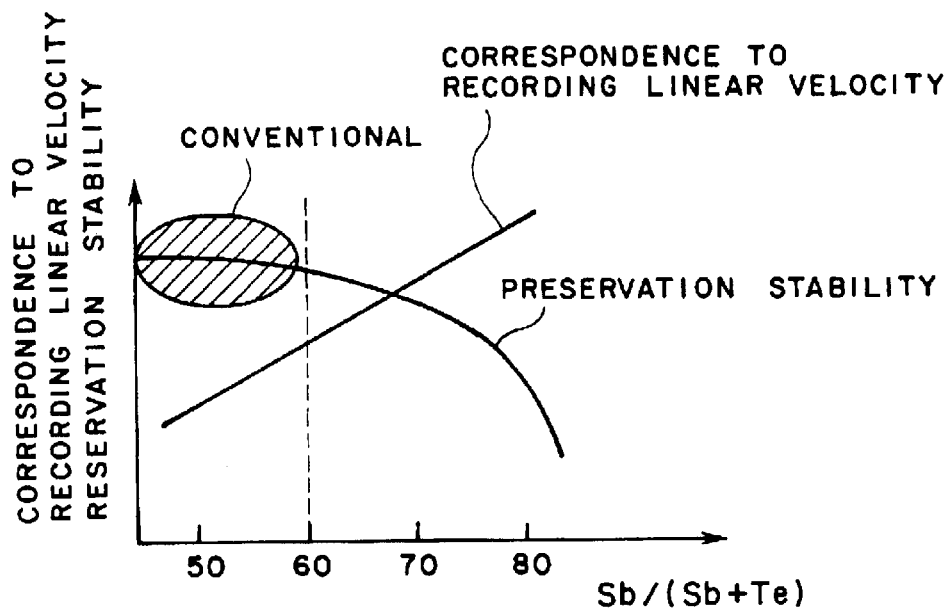
FIG. 1 is a diagram showing the relationship between the atomic ratio of Sb/(Sb+Te) and the recording linear velocity and preservation stability.

In the above optical recording medium, it is also preferable that the contents of Sb and Te in terms of atomic ratio contained in the pseudo binary eutectic composition of the phase-change recording material satisfy a relationship of $0.65 \leq Sb/(Sb+Te) \leq 0.85$ from the same viewpoints as mentioned above. The tendency shown in FIG. 1 is considered to support this.

In the above optical recording medium, it is also preferable that the content ratio B of Ge in terms of atomic ratio contained in the pseudo binary composition of the phase-change recording material be in a range of $0.01 \leq B \leq 0.07$, more preferably $0.01 \leq B \leq 0.05$. The thus added Ge serves to hinder the reduction of the preservation stability when the correspondence to the recording linear velocity is further improved in the above-mentioned relationship of the composition of Sb and Te.

Figure 4A:
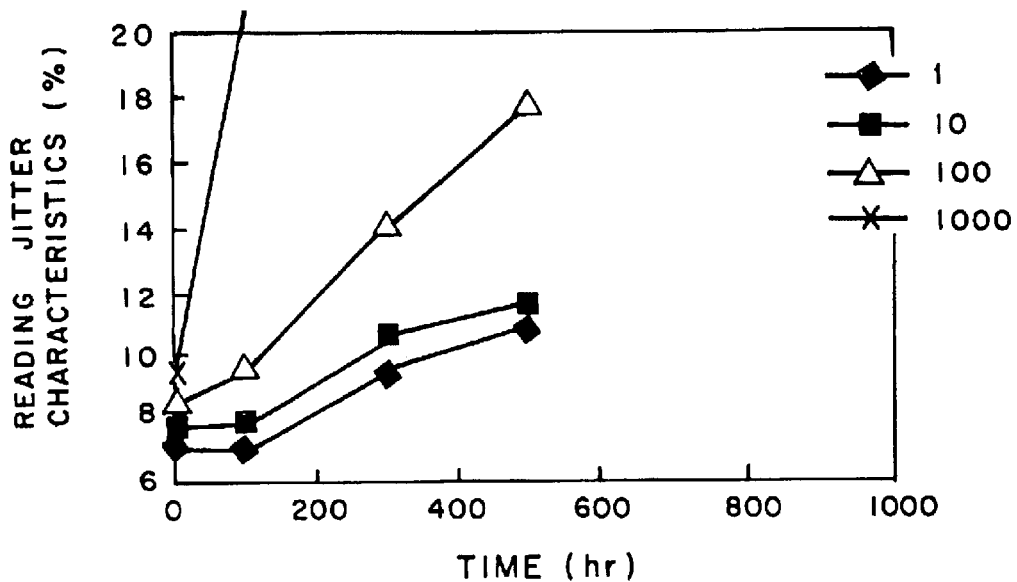
FIGS. 4A and 4B are comparative diagrams indicating that the addition of Ge to the recording material significantly improves the preservation stability of the optical recording medium.
Figure 4B:
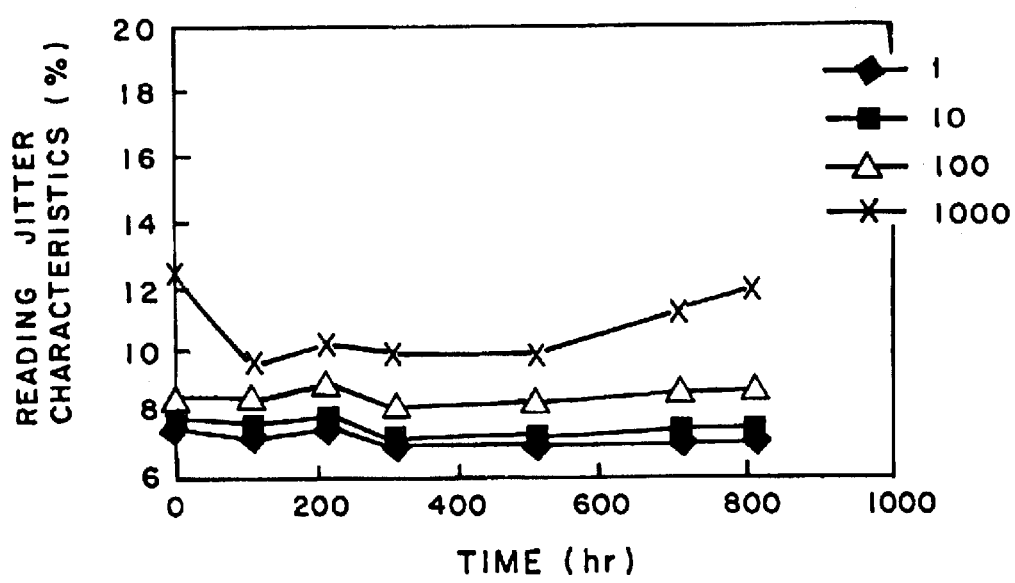
Figure 5:
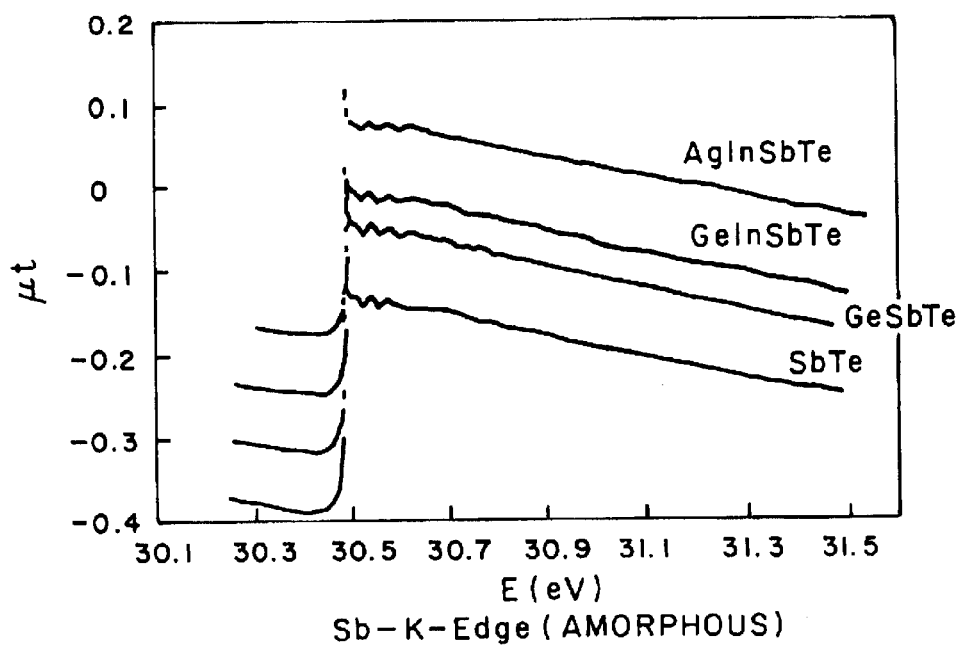
FIGS. 5 to 8 are graphs indicating the bonding state of the recording materials comprising Sb and Te when additional elements are added thereto, analyzed by an XAFS analysis, using synchrotron radiation.
Figure 6:
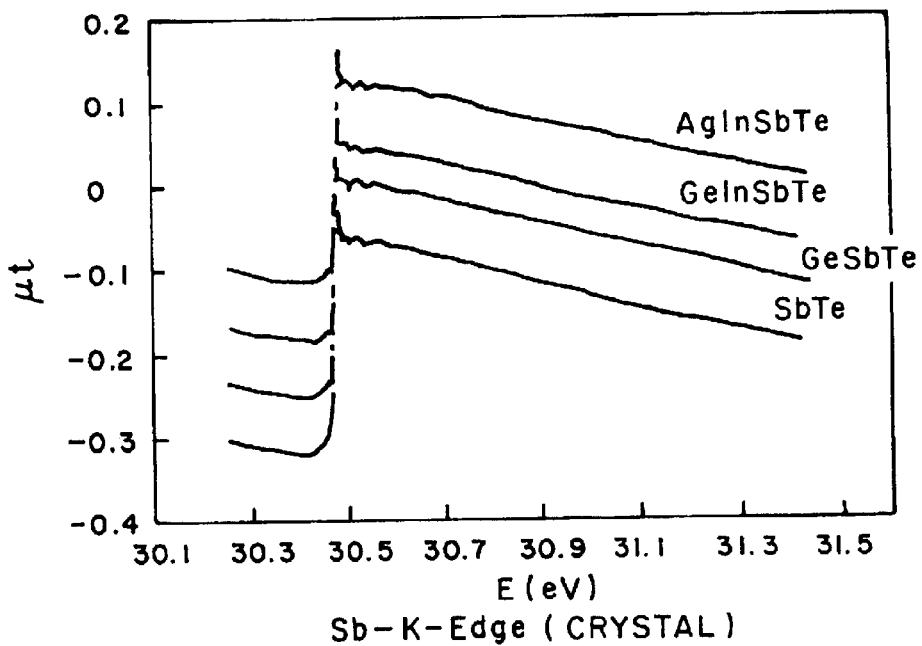
Figure 7:
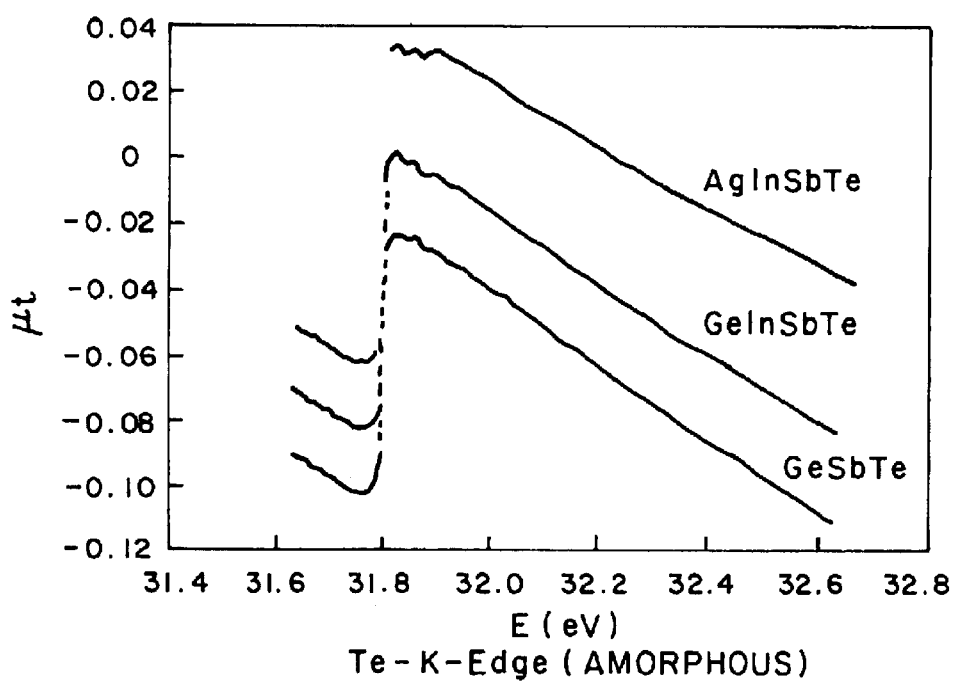
Figure 8:
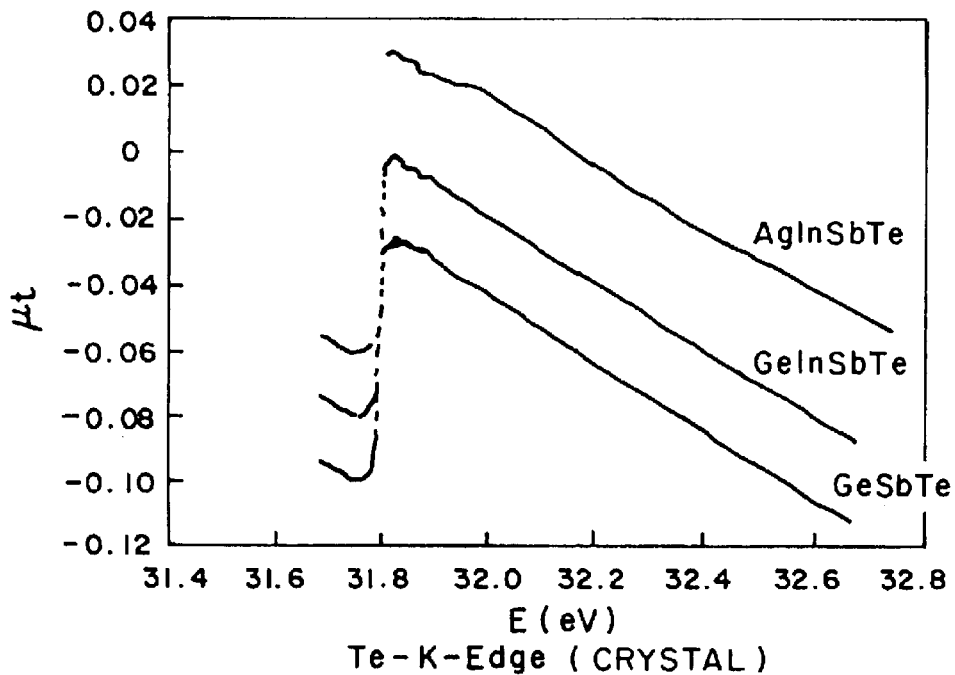
Figure 9:
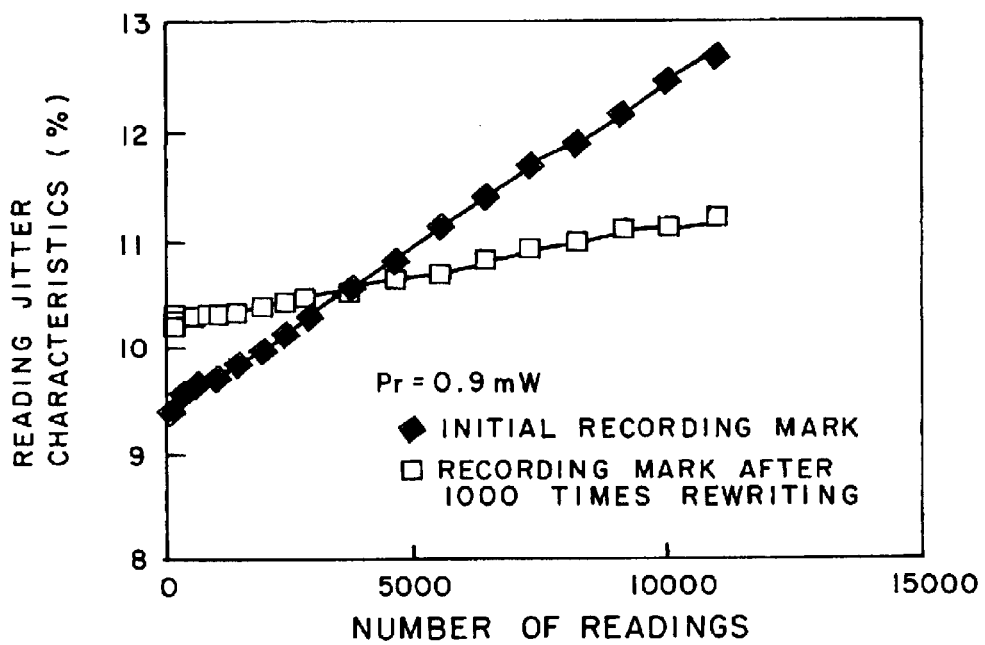
FIG. 9 is a graph showing the relationship between the number of readings and the jitter characteristics of an optical recording disk in Example 1.
Figure 10:
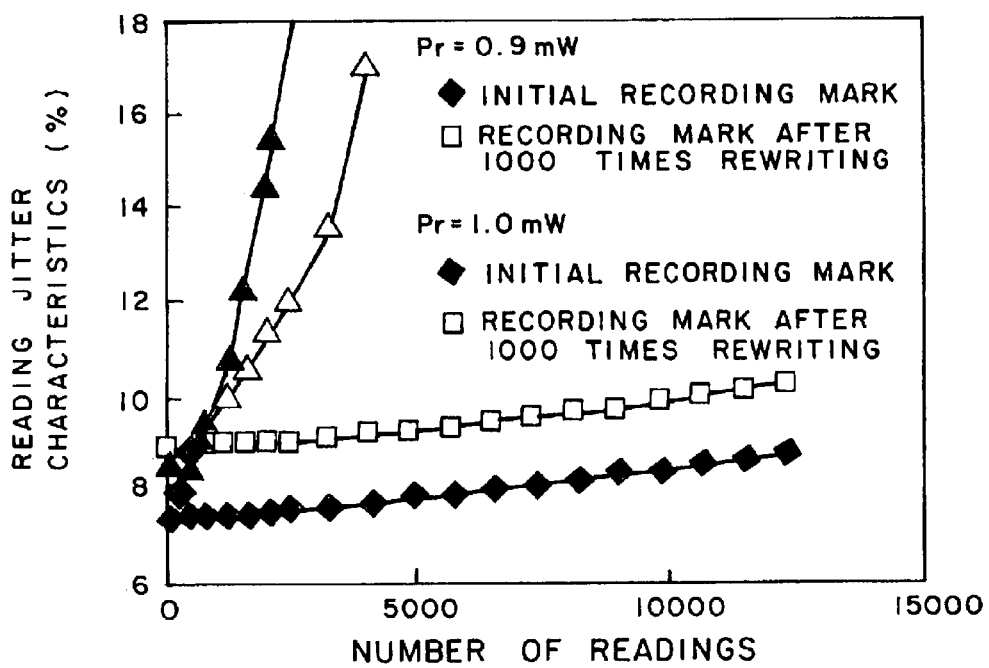
FIG. 10 is a graph showing the relationship between the number of readings and the jitter characteristics of an optical recording disk in Example 2.
Figure 11:
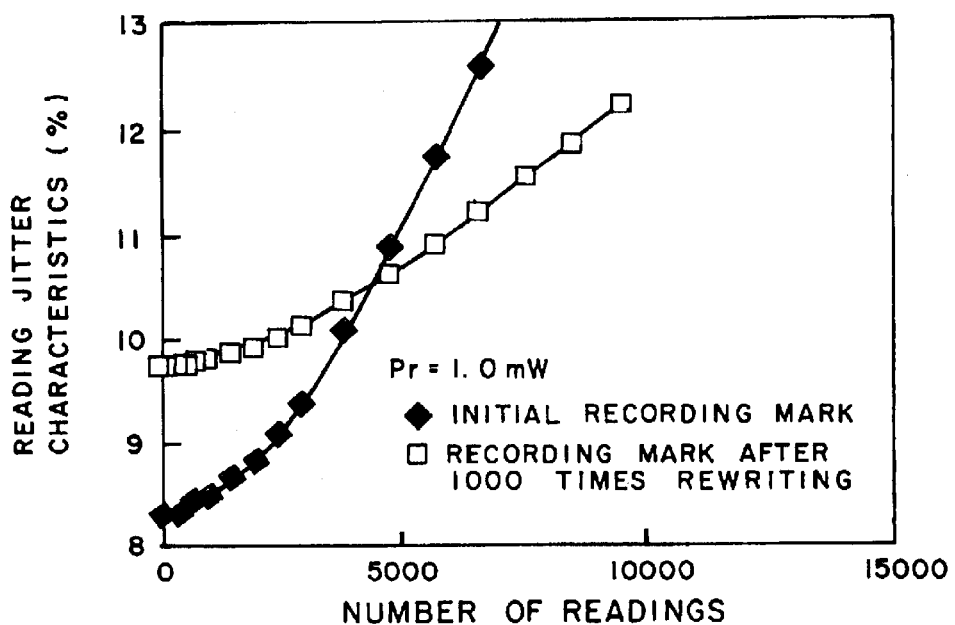
FIG. 11 is a graph showing the relationship between the number of readings and the jitter characteristics of an optical recording disk in Example 3.
Figure 12:
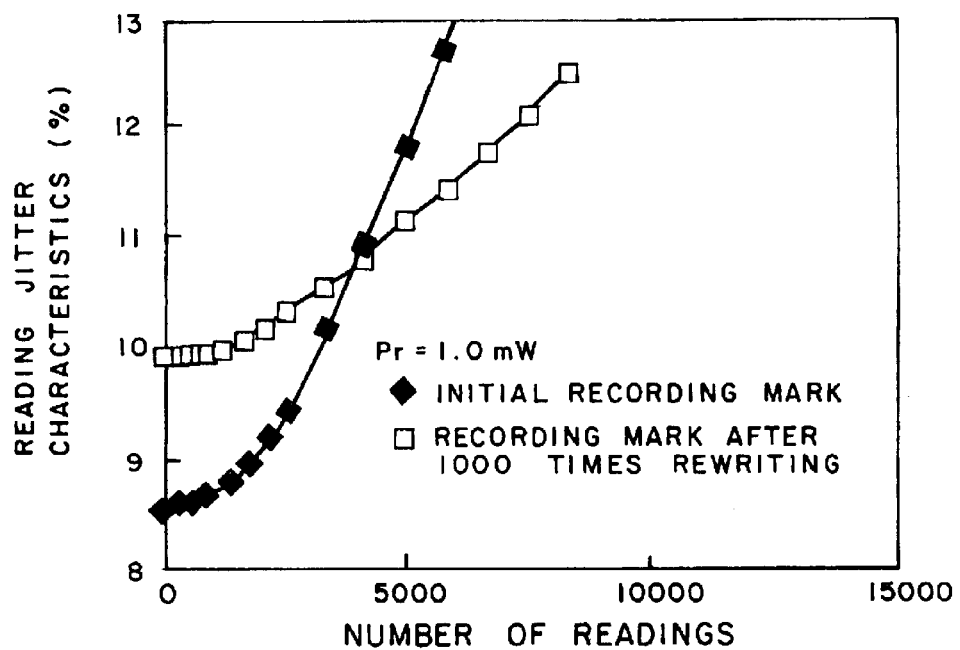
FIG. 12 is a graph showing the relationship between the number of readings and the jitter characteristics of an optical recording disk in Example 4.
Figure 13:
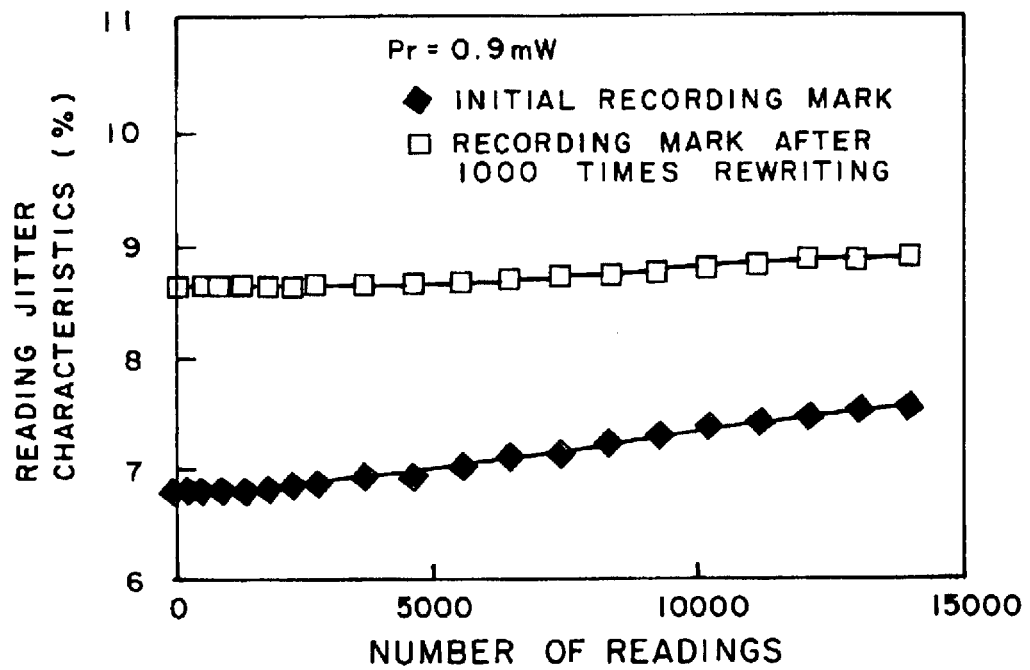
FIG. 13 is a graph showing the relationship between the number of readings and the jitter characteristics of an optical recording disk in Example 5.
Figure 14:
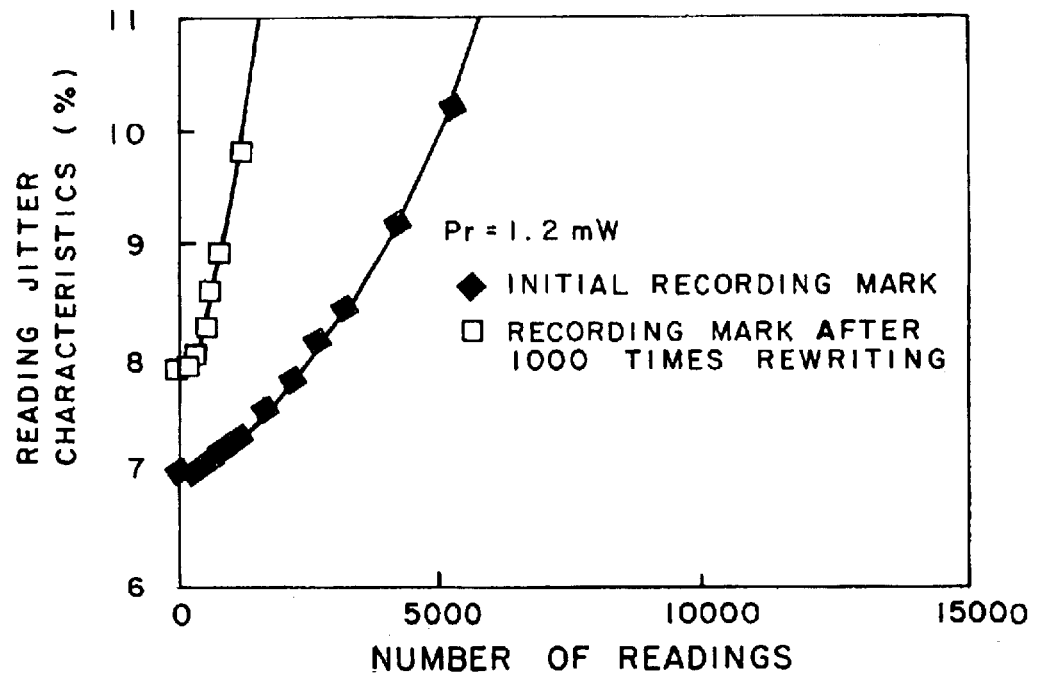
FIG. 14 is a graph showing the relationship between the number of readings and the jitter characteristics of an optical recording disk in Comparative Example 1.
Figure 15:
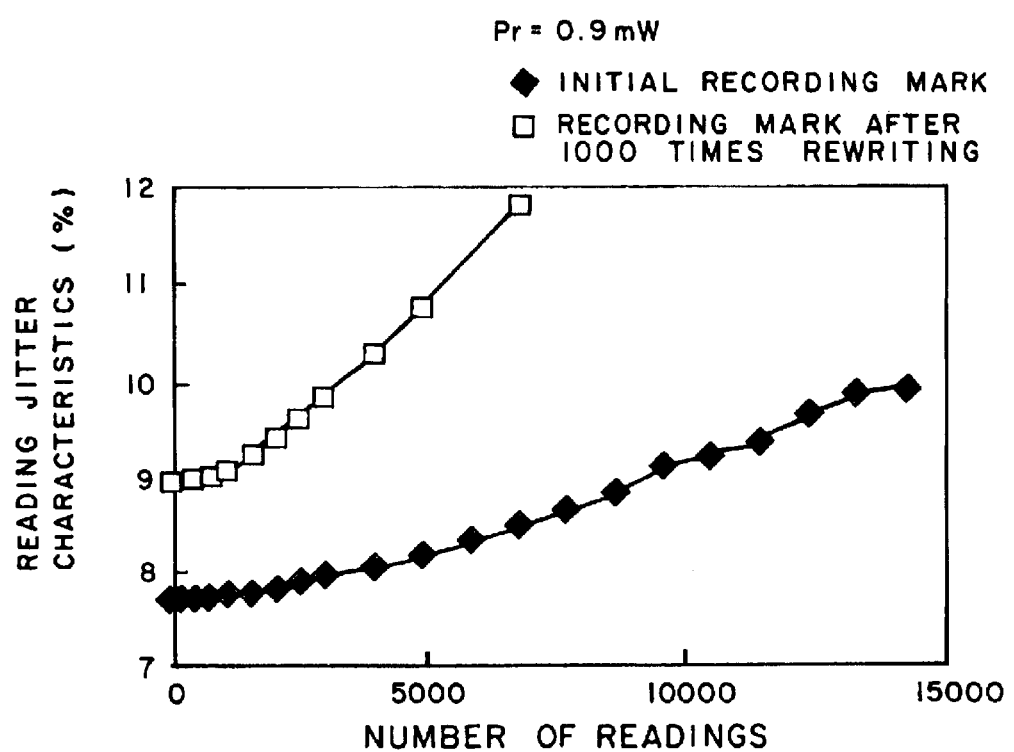
FIG. 15 is a graph showing the relationship between the number of readings and the jitter characteristics of an optical recording disk in Comparative Example 2.

FIG. 4A and FIG. 4B respectively compare the jitter characteristics when Ge was not added, and the jitter characteristics when Ge was added, namely FIG. 4A is for $Ag_{2.5}In_{3.0}xSb_{71.5}Te_{23.0}$, and FIG. 4B is for $Ag_{0.5}In_{3.0}Sb_{71.5}Te_{23.0}Ge_{2.0}$.

For the comparison of the jitter characteristics, two sample optical recording media were fabricated by sputtering on a disk-shaped substrate made of polycarbonate with a diameter of 120 mm and a thickness of 0.6 mm the following layered structure composed of (a) an underocat layer composed of $Zn.SiO_2$ with a thickness of 100 nm, (b) a recording layer composed of any of the above-mentioned recording materials ($Ag_{2.5}In_{3.0}xSb_{71.5}Te_{23.0}$ or $Ag_{0.5}In_{3.0}Sb_{71.5}Te_{23.0}Ge_{2.0}$ with a thickness of 20 nm formed on the first protective layer, (c) a protective layer composed of $Zn.SiO_2$ with a thickness of 20 nm formed on the recording layer, and (d) a reflection layer made of Al with a thickness of 140 nm formed on the protective layer.

The thus fabricated two optical recording media were preserved at 80° C., 85% RH, and the jitter characteristics thereof were then measured by writing a recording mark and rewriting the recording mark.

The results of the measurement of the jitter characteristics are shown in FIG. 4A and FIG. 4B. In the graphs in FIG. 4A and FIG. 4B, the number for each curve denotes the number of rewriting, provided that the number 1 indicates writing of the recording mark one time.

The results of the measurement of the jitter characteristics shown in FIG. 4A and FIG. 4B indicate that there is a tendency that the preservation stability is significantly improved by the addition of Ge to the recording material.

It is preferable that a recording material comprising Sb, Te and Ge for use in the recording layer have the following composition of Sb, Te and Ge in terms of atomic ratio thereof:

Sb: 0.60 to 0.80, more preferably 0.63 to 0.75, furthermore preferably 0.65 to 0.75, Te: 0.15 to 0.30, more preferably 0.20 to 0.25, Ge: 0.01 to 0.07, more preferably 0.02 to 0.05.

When the content of Sb is smaller than the above-mentioned broadest range, an optical recording disk with high recording liner velocity tends to become difficult to obtain, while when the content of Sb is greater than the above-mentioned broadest range, an optical recording disk with high preservation stability tends to become difficult to obtain.

When the content of Te is smaller than the above-mentioned broadest range, the preservation stability and the rewriting characteristics tend to deteriorate, while when the content of Te is greater than the above-mentioned broadest range, the optical recording disk tends to become unsuitable for recording with high linear velocity.

When the content of Ge is smaller than the above-mentioned broadest range, the preservation stability tends to deteriorate, while when the content of Ge is greater than the above-mentioned broadest range, the optical recording disk tends to become unsuitable for recording with high linear velocity.

In the optical recording medium of the present invention, the pseudo binary composition of the phase-change recording material may further comprise as an additional element at least one element selected from the group consisting of Ag, In and Bi, in order to improve the characteristics of the optical recording medium such as the modulation degree of the recording marks. When the above-mentioned additional element is added to the phase-change recording material, it is preferable that the atomic ratio thereof be in the range of about 0.01 to 0.09.

FIGS. 5 to 8 show the results of the analysis of recording materials including the above-mentioned additional elements with respect to the bonding state thereof by an Sb—K—Edge XAFS analysis using synchrotron radiation. The results of the analysis indicate that the additional elements are bonded to Te.

In the above-mentioned optical recording medium of the present invention, it is preferable that the pseudo binary composition of the phase-change recording material comprise Sb, Te, Ge, Ag, and In in the respective ranges of atomic ratio of:

Sb: 0.60 to 0.80, more preferably 0.63 to 0.75, furthermore preferably 0.65 to 0.75, Te: 0.15 to 0.30, more preferably 0.20 to 0.25, Ge: 0.01 to 0.07, more preferably 0.02 to 0.05, Ag: 0.001 to 0.03, more preferably 0.001 to 0.02, and In: 0.02 to 0.09, more preferably 0.03 to 0.09.

When the content of Sb is smaller than the above-mentioned broadest range, the optical recording disk tends to become unsuitable for recording with high recording liner velocity, while when the content of Sb is greater than the above-mentioned broadest range, the preservation stability thereof tends to deteriorate.

When the content of Te is smaller than the above-mentioned broadest range, the preservation stability tends to deteriorate, while when the content of Te is greater than the above-mentioned broadest range, recording with high recording linear velocity tends to become difficult to perform, and the rewriting characteristics tend to deteriorate.

When the content of Ge is smaller than the above-mentioned broadest range, the preservation stability tends to deteriorate, while when the content of Ge is greater than the above-mentioned broadest range, the optical recording disk tends to become unsuitable for recording with high recording linear velocity.

When the content of Ag is smaller than the above-mentioned broadest range, the jitter characteristics and the modulation degree tend to deteriorate, while when the content of Ag is greater than the above-mentioned broadest range, recording with high recording linear velocity tends to become difficult to perform.

When the content of In is smaller than the above-mentioned broadest range, the modulation degree tends to become small, while when the content of In is greater than the above-mentioned broadest range, the reading optical stability of the optical recording medium tends to deteriorate.

The optical recording media using the phase-change recording materials with the above-mentioned compositions exhibit extremely excellent C/N ratio, erasing ratio, sensitivity, jitter characteristics, correspondence to recording linear velocity, reading optical stability, and preservation stability, and accordingly can be sufficiently used in DVD-RW.

The recording layer of the optical recording medium of the present invention can be formed by a conventional film formation method such as sputtering. When the recording layer was formed by sputtering in the present invention, the sputtering was conducted by DC magnetron sputtering under the conditions that the applied power was 0.5 kW, the pressure of Ar gas was 2 mTorr, and the back pressure in a film formation chamber immediately before the formation of the recording layer was $1 \times 10^{-7}$ Torr.

Under the above-mentioned conditions for the sputtering, the sputtering rate for the formation of the recording layer was 1.2 times or more than the sputtering rate in the Rf sputtering which was adopted previously. Thus, in comparison with the Rf sputtering, the DC magnetron sputtering is capable of forming the recording layer in a shorter time. Furthermore, the DC magnetron sputtering is capable of forming the recording layer comprising the recording material with the above-mentioned crystal structure, composition, and characteristics.

It is preferable that the recording layer have a thickness of 5 nm to 30 nm, more preferably a thickness of 10 nm to 20 nm.

The optical recording medium of the present invention comprises the above-mentioned recording layer which is provided on a substrate.

As the materials for the substrate, glass, ceramics, and resins can be employed. Of these materials, resins are preferable for forming the substrate. This is because a resin substrate is advantageous over other substrates in terms of fabrication and cost. Representative examples of the resin for forming the substrate are polycarbonate resin, epoxy resin, polystyrene resin, acrylonitrile-styrene copolymer resin, polyethylene resin, and polymethyl methacrylate resin. In view of the workability and optical characteristics, polycarbonate resin is the most preferable of the above-mentioned resins. When a substrate made of polycarbonate is used, it is preferable to provide an ultraviolet absorbing layer on a light-incident side of the substrate.

The substrate can be variously shaped, for example, disk-shaped, card-shaped, or sheet-shaped, with an arbitrary thickness, such as 1.2 mm, 0.6 mm, and 0.3 mm.

In the optical recording medium of the present invention, when necessary, there can be provided an undercoat layer between the substrate and the recording layer, a protective layer on the recording layer, and a hard coat layer on the protective layer.

Furthermore, there can be provided a reflection layer between the protective layer and the hard coat layer.

Furthermore, it is preferable that an ultraviolet absorbing layer be provided on at least one side of the optical recording medium.

As the materials for the undercoat layer and the protective layer, there can be employed oxides such as SiO, $SiO_2$, ZnO, $SnO_2$, $Al_2O_3$, $TiO_2$, $In_2O_3$, MgO and $ZrO_2$, nitrides such as $Si_3N_4$, AlN, TiN, BN and ZrN, sulfides such as ZnS, $In_2S_3$ and $TaS_4$, carbides such as SiC, TaC, $B_4C$, WC, TiC and ZrC, diamond-like carbon, and mixtures thereof.

The undercoat layer and the protective layer can be formed, for instance, by sputtering, ion-plating, vacuum deposition, and plasma CVD.

It is preferable that the undercoat layer have a thickness of 20 nm to 250 nm, more preferably 40 nm to 250 nm, furthermore preferably 160 nm to 250 nm.

It is preferable that the protective layer have a thickness of 5 nm to 150 nm, more preferably 10 nm to 30 nm.

As the materials for the reflection layer, there can be employed metal materials such as Al, Ag and Au, and the metal materials to which additive materials such as Ti, Cr, and Si are added.

The reflection layer can be formed, for instance, by sputtering, ion-plating, vacuum deposition, and plasma CVD.

It is preferable that the reflection layer have a thickness of 50 nm to 200 nm, more preferably 80 nm to 150 nm.

It is preferable that the materials for the hard coat layer be ultraviolet curing resins such as urethane acrylate, acrylate, and mixtures thereof, although the materials therefor are not limited to such ultraviolet curing resins.

It is preferable that the hard coat layer have a thickness of about 1 $\mu$m to about 50 $\mu$m.

When information is written in the optical recording medium of the present invention, and written information is read therefrom, as the light for writing and reading, there can be employed various kinds of light beams other than laser beam. It is preferable that the spot diameter of the beams be in the range of 0.05 $\mu$m to 2 $\mu$m, more preferably in the range of 0.1 $\mu$m to 1.6 $\mu$m.

It is preferable that the power of the writing light be about 8 mW to about 20 mW, and the power of the reading light be about 0.3 mW to about 1.0 mW.

It is preferable that the writing light and the reading light have a wavelength of 200 nm to 1000 nm, more preferably a wavelength of 400 nm to 800 nm.

It is preferable that the recording linear velocity be in the range of 1 m/s to 30 m/s, more preferably in the range of 1.2 m/s to 18 m/s.

Other features of this invention will become apparent in the course of the following description of exemplary embodiments, which are given for illustration of the invention and are not intended to be limiting thereof.

EXAMPLE 1

On a polycarbonate disk-shaped substrate with a groove having a track pitch of 0.74 $\mu$m and a depth of about 500 Å formed thereon, a recording layer was formed by use of a target with the composition of $Sb_{74.0}Te_{21.0}Ge_{5.0}$ as shown in TABLE 1 by DC magnetron sputtering under the following conditions:

| | |
|---|---|
| Back pressure: | $1 \times 10^{-7}$ Torr |
| Gas used: | Ar |
| Applied power: | 0.5 kW |
| Gas pressure: | 2 mTorr |

On the thus formed recording layer, a reflection layer made of AlTi with a thickness of 140 nm was formed, whereby an optical recording disk No. 1 of the present invention was fabricated.

EXAMPLES 2 TO 5 AND COMPARATIVE EXAMPLES 1 AND 2

The procedure of the fabrication of the optical recording disk No. 1 of the present invention in Example 1 was repeated in the same manner as in Example 1 except that the target used in Example 1 was replaced by the respective targets with the compositions as shown in TABLE 1, whereby optical recording disks No. 2 to No. 5 of the present invention, and comparative optical recording disks No. 1 and No. 2 were fabricated.

TABLE 1

| | Composition of Target |
|---|---|
| Ex. 1 | $Sb_{74.0}Te_{21.0}Ge_{5.0}$ |
| Ex. 2 | $Sb_{72.2}Te_{23.8}Ag_{0.5}In_{3.0}Ge_{0.5}$ |
| Ex. 3 | $Sb_{71.5}Te_{24.0}Ag_{0.5}In_{3.0}Ge_{1.0}$ |
| Ex. 4 | $Sb_{71.5}Te_{23.0}Ag_{0.5}In_{3.0}Ge_{2.0}$ |
| Ex. 5 | $Sb_{68.5}Te_{24.0}Ag_{0.5}In_{5.0}Ge_{2.0}$ |
| Comp. Ex. 1 | $Sb_{75.0}Te_{25.0}$ |
| Comp. Ex. 2 | $Sb_{71.5}Te_{23.0}Ag_{2.5}In_{3.0}$ |

Each of the thus fabricated optical recording disks No. 1 to No. 5 of the present invention, and the comparative optical recording disks No. 1 and No. 2 were evaluated with respect to the preservation stability and the reading optical stability, and the comparison of the magnitudes of $d_1$ and $d_{ow}$ under the following conditions, provided that all of the tested optical recording media had a good sensitivity with a modulation degree of 50% or more when recording marks were written by a laser beam with a predetermined power:

| | |
|---|---|
| R (= $\sigma_{repeat}/\sigma_1$): | 1.2 to 1.5 |
| Wavelength of laser beam: | 660 nm |
| Spot diameter of laser beam: | 0.9 μm |
| NA of objective: | 0.65 |
| Reading linear velocity: | DVD ROM equal velocity (3.5 m/s) |

Each of the above-mentioned characteristics was evaluated as follows:

[Preservation Stability]

Each optical recording disk with a recording mark recorded therein was preserved at a temperature as high as 80° C. to 90° C. and a humidity as high as 85% RH, and the recording characteristics (jitter characteristics) were compared before and after the preservation.

[Reading Optical Stability]

Each optical recording disk was continuously irradiated with a reading light beam with a power of about 0.5 mW to about 1.5 mW, and the changes in the jitter characteristics in the reading were monitored.

[Comparison of the Magnitudes of $d_1$ and $d_{ow}$]

The magnitudes of $d_1$ and $d_{ow}$, which are respectively defined in the above, were compared in terms of the jitter characteristics at the $5000^{th}$ of the repeated readings, and with and without rewritings.

The results of the above evaluation are shown in TABLE 2 and also in FIG. 9 to FIG. 15.

TABLE 2

| | $d_1$–$d_{ow}$ | Preservation stability | Reading optical stability |
|---|---|---|---|
| Example 1 | + | ○ | ○ |
| Example 2 | + | ○ | ○ |
| Example 3 | + | ○ | ○ |
| Example 4 | + | ○ | ○ |
| Example 5 | + | ○ | ○ |
| Comp. Ex. 1 | − | X | ○ |
| Comp. Ex. 2 | − | X | ○ |

In the above TABLE 2, the symbol "○" denotes that the characteristics are suitable for use in practice, and the symbol "X" denotes that the characteristics are not suitable for use in practice.

The results shown in the above TABLE 2 indicate that the optical recording disks of the present invention have excellent preservation stability and reading optical stability. Furthermore, the optical recording disks of the present invention had a correspondence to recording linear velocity of 8 m/s to 13.5 m/s, which was excellent. This corresponds to 2 to 3 times the recording linear velocity of DVD-ROM in the same recording density as that of DVD-ROM.

Japanese Patent Application No. 2000-099757, filed Mar. 31, 2000, is hereby incorporated by reference.

What is claimed is:

1. An optical recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is $d(=\sigma_{repeat}/\sigma_1)$, said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark.

2. The optical recording medium as claimed in claim 1, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

3. The optical recording medium as claimed in claim 2, wherein the total content ratio A of Sb and Te in terms of atomic ratio contained in said pseudo binary composition of said phase-change recording material is in a range of $0.80 \leq A \leq 0.97$.

4. The optical recording medium as claimed in claim 2, wherein the contents of Sb and Te in terms of atomic ratio contained in said pseudo binary eutectic composition of said phase-change recording material satisfy a relationship of $0.65 \leq Sb/(Sb+Te) \leq 0.85$.

5. The optical recording medium as claimed in claim 2, wherein the content ratio B of Ge in terms of atomic ratio contained in said pseudo binary composition of said phase-change recording material is in a range of $0.01 \leq B \leq 0.07$.

6. The optical recording medium as claimed in claim 2, wherein said pseudo binary composition of said phase-change recording material further comprises as an additional element at least one element selected from the group consisting of Ag, In and Bi.

7. The optical recording medium as claimed in claim 6, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

8. A phase-change recording material for use in a recording layer of an optical recording medium, which phase-change recording material is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is d $(=\sigma_{repeat}/\sigma_1)$, said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark.

9. The phase-change recording material as claimed in claim 8, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

10. The phase-change recording material as claimed in claim 9, wherein the total content ratio A of Sb and Te in terms of atomic ratio contained in said pseudo binary composition of said phase-change recording material is in a range of $0.80 \leq A \leq 0.97$.

11. The phase-change recording material as claimed in claim 9, wherein the contents of Sb and Te in terms of atomic ratio contained in said pseudo binary eutectic composition of said phase-change recording material satisfy a relationship of $0.65 \leq Sb/(Sb+Te) \leq 0.85$.

12. The phase-change recording material as claimed in claim 9, wherein the content ratio B of Ge in terms of atomic ratio contained in said pseudo binary composition of said phase-change recording material is in a range of $0.01 \leq B \leq 0.07$.

13. The phase-change recording material as claimed in claim 9, wherein said pseudo binary composition of said phase-change recording material further comprises as an additional element at least one element selected from the group consisting of Ag, In and Bi.

14. The phase-change recording material as claimed in claim 13, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

15. A method of producing an optical recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is d $(=\sigma_{repeat}/\sigma_1)$, said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark, comprising the step of forming said recording layer by performing sputtering, using a target, with a sputtering power of 0.1 kW to 1.5 kW, said target being prepared by fusing and mixing a composition composed of a plurality of elements with a predetermined composition, crushing said composition to prepare a pulverized composition, and sintering said pulverized composition.

16. The method as claimed in claim 15, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

17. The method as claimed in claim 16, wherein the total content ratio A of Sb and Te in terms of atomic ratio contained in said pseudo binary composition of said phase-change recording material is in a range of $0.80 \leq A \leq 0.97$.

18. The optical recording medium as claimed in claim 16, wherein the contents of Sb and Te in terms of atomic ratio contained in said pseudo binary eutectic composition of said phase-change recording material satisfy a relationship of $0.65 \leq Sb/(Sb+Te) \leq 0.85$.

19. The method as claimed in claim 16, wherein the content ratio B of Ge in terms of atomic ratio contained in said pseudo binary composition of said phase-change recording material is in a range of $0.01 \leq B \leq 0.07$.

20. The method as claimed in claim 16, wherein said pseudo binary composition of said phase-change recording material further comprises as an additional element at least one element selected from the group consisting of Ag, In and Bi.

21. The method as claimed in claim 20, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

22. A method of producing an optical recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is d (=$\sigma_{repeat}/\sigma_1$), said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark, comprising the step of forming said recording layer by sputtering, using a target, with a sputtering pressure of 0.8 mTorr to 9 mTorr, said target being prepared by fusing and mixing a composition composed of elements with a predetermined composition, crushing said composition to prepare a pulverized composition, and sintering said pulverized composition.

23. The method as claimed in claim 22, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

24. The method as claimed in claim 23, wherein the total content ratio A of Sb and Te in terms of atomic ratio contained in said pseudo binary composition of said phase-change recording material is in a range of $0.80 \leq A \leq 0.97$.

25. The method as claimed in claim 23, wherein the contents of Sb and Te in terms of atomic ratio contained in said pseudo binary eutectic composition of said phase-change recording material satisfy a relationship of $0.65 \leq Sb/(Sb+Te) \leq 0.85$.

26. The method as claimed in claim 23, wherein the content ratio B of Ge in terms of atomic ratio contained in said pseudo binary composition of said phase-change recording material is in a range of $0.01 \leq B \leq 0.07$.

27. The method as claimed in claim 23, wherein said pseudo binary composition of said phase-change recording material further comprises as an additional element at least one element selected from the group consisting of Ag, In and Bi.

28. The method as claimed in claim 27, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

29. A method of producing an optical recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitters repeat to said 1st reading jitter $\sigma_1$ is d(=$\sigma_{repeat}/\sigma_1$), said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark, comprising the step of forming said recording layer by performing sputtering, using a target, in a sputtering chamber with the pressure in said sputtering chamber being set at a vacuum degree of $9 \times 10^{-7}$ Torr or less immediately before said recording layer is formed, said target being prepared by fusing and mixing a composition composed of a plurality of elements with a predetermined composition, crushing said composition to prepare a pulverized composition, and sintering said pulverized composition.

30. The method as claimed in claim 29, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

31. The method as claimed in claim 30, wherein the total content ratio A of Sb and Te in terms of atomic ratio contained in said pseudo binary composition of said phase-change recording material is in a range of $0.80 \leq A \leq 0.97$.

32. The method as claimed in claim 30, wherein the contents of Sb and Te in terms of atomic ratio contained in said pseudo binary eutectic composition of said phase-change recording material satisfy a relationship of $0.65 \leq Sb/(Sb+Te) \leq 0.85$.

33. The method as claimed in claim 30, wherein the content ratio B of Ge in terms of atomic ratio contained in said pseudo binary composition of said phase-change recording material is in a range of $0.01 \leq B \leq 0.07$.

34. The method as claimed in claim 30, wherein said pseudo binary composition of said phase-change recording material further comprises as an additional element at least one element selected from the group consisting of Ag, In and Bi.

35. The method as claimed in claim 34, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

36. A method of writing information, reading written information, and rewriting written information in an optical recording medium with irradiating said optical recording medium with a laser beam with a spot diameter of 0.05 $\mu$m to 2.0 $\mu$m, said optical information recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is d ($=\sigma_{repeat}/\sigma_1$), said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark.

37. The method as claimed in claim 36, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

38. The method as claimed in claim 37, wherein the total content ratio A of Sb and Te in terms of atomic ratio contained in said pseudo binary composition of said phase-change recording material is in a range of $0.80 \leq A \leq 0.97$.

39. The method as claimed in claim 37, wherein the contents of Sb and Te in terms of atomic ratio contained in said pseudo binary eutectic composition of said phase-change recording material satisfy a relationship of $0.65 \leq Sb/(Sb+Te) \leq 0.85$.

40. The method as claimed in claim 37, wherein the content ratio B of Ge in terms of atomic ratio contained in said pseudo binary composition of said phase-change recording material is in a range of $0.01 \leq B \leq 0.07$.

41. The method as claimed in claim 37, wherein said pseudo binary composition of said phase-change recording material further comprises as an additional element at least one element selected from the group consisting of Ag, In and Bi.

42. The method as claimed in claim 41, wherein said pseudo binary composition of said phase-change recording material comprises Sb, Te, Ge, Ag, and In in the respective ranges of atomic ratio of:

Sb: 0.60 to 0.80,
Te: 0.15 to 0.30,
Ge: 0.01 to 0.07,
Ag: 0.001 to 0.03, and
In: 0.02 to 0.09.

43. A method of writing information, reading written information, and rewriting written information in an optical recording medium with irradiating said optical recording medium with a linear recording speed of 1.2 m/s to 25 m/s, said optical information recording medium comprising a recording layer which comprises a phase-change recording material which is capable of performing a reversible phase change from a crystalline phase to an amorphous phase and vice versa by light irradiation of said phase-change recording material, said recording layer being capable of writing information therein, reading written information therefrom, and rewriting written information by utilizing said reversible phase change of said phase-change recording material, wherein when a recording mark formed in said recording layer is repeatedly read 5000 times, using a continuous wave laser beam having such an intensity Pr that satisfies the condition of $1.1 \leq R \leq 2.0$, in which R is the ratio of a 5000th repeated reading jitter $\sigma_{repeat}$ of a recording mark to a 1st reading jitter $\sigma_1$ of said recording mark, namely R is $\sigma_{repeat}/\sigma_1$, and a jitter increasing ratio of said 5000th repeated reading jitter $\sigma_{repeat}$ to said 1st reading jitter $\sigma_1$ is d ($=\sigma_{repeat}/\sigma_1$), said optical recording medium satisfies a relationship of $d_1 > d_{ow}$, in which $d_1$ is said jitter increasing ratio of an initial writing mark, and $d_{ow}$ is a jitter increasing ratio of a 1000-times rewritten recording mark.

44. The method as claimed in claim 43, wherein said phase-change recording material comprises a pseudo binary composition, which has an NaCl-type crystal structure in the crystalline phase, wherein:

said pseudo binary composition is represented by Sb—TeM, comprising two portions, one portion being represented by Sb, and the other portion being represented by TeM, in which M represents a metal compound comprising at least Sb or Ge, provided that when TeM is $Sb_2Te_3$, said pseudo binary composition is a pseudo binary eutectic composition, and that at least one of the portions represented by TeM comprises Sb, and at least one of the other portions represented by TeM comprises Ge.

45. The method as claimed in claim 44, wherein the total content ratio A of Sb and Te in terms of atomic ratio contained in said pseudo binary composition of said phase-change recording material is in a range of $0.80 \leq A \leq 0.97$.

46. The method as claimed in claim 44, wherein the contents of Sb and Te in terms of atomic ratio contained in said pseudo binary eutectic composition of said phase-change recording material satisfy a relationship of $0.65 \leq Sb/(Sb+Te) \leq 0.85$.

47. The method as claimed in claim 44, wherein the content ratio B of Ge in terms of atomic ratio contained in said pseudo binary composition of said phase-change recording material is in a range of $0.01 \leq B \leq 0.07$.

48. The method as claimed in claim 44, wherein said pseudo binary composition of said phase-change recording material further comprises as an additional element at least one element selected from the group consisting of Ag, In and Bi.

49. The method as claimed in claim 48, wherein said pseudo binary composition of said phase-change recording material comprises Sb, Te, Ge, Ag, and In in the respective ranges of atomic ratio of:

Sb: 0.60 to 0.80,

Te: 0.15 to 0.30,

Ge: 0.01 to 0.07,

Ag: 0.001 to 0.03, and

In: 0.02 to 0.09.

* * * * *